Oct. 5, 1943.  W. F. COLLIER  2,330,870
MINNOW BUCKET CARRIER AND AERATING DEVICE
Filed June 17, 1941
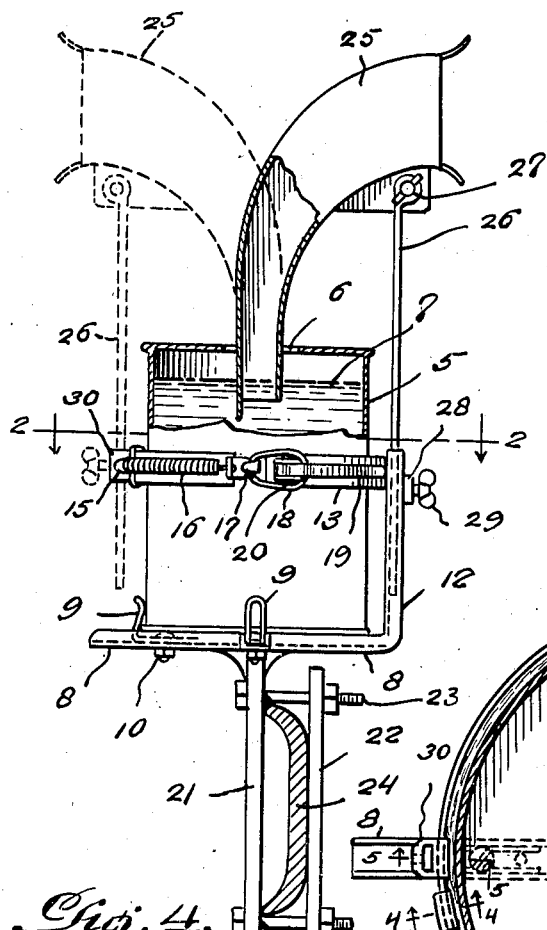
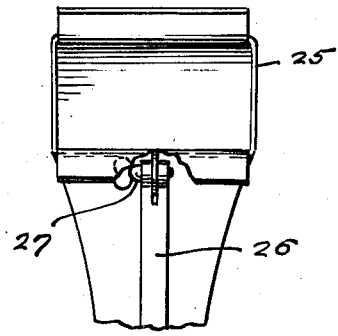
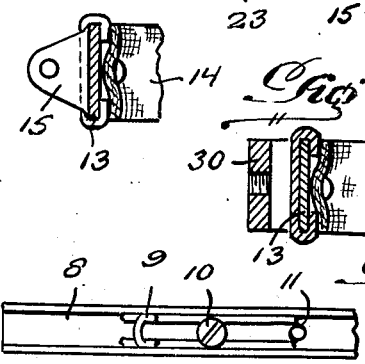

Patented Oct. 5, 1943

2,330,870

UNITED STATES PATENT OFFICE 2,330,870

MINNOW BUCKET CARRIER AND AERATING DEVICE

William Floyd Collier, Hydro, Okla.

Application June 17, 1941, Serial No. 398,479

2 Claims. (Cl. 43—56)

This invention relates to a device whereby a minnow bucket may be attached to and carried by an automobile exteriorly of the latter, and whereby air may be delivered into the minnow bucket beneath the normal water level thereof upon forward travel of the automobile, so as to effectively keep the minnows or other live bait within the bucket alive during transit.

Generally described, the present invention contemplates the provision of a carrier for an ordinary minnow bucket having means to mount the same upon an automobile exteriorly of the latter, and means to support an air delivery funnel in proper relation to the minnow bucket so that said funnel opens in the direction of the line of travel of the automobile to effectively collect air and deliver it into the minnow bucket below the normal water level thereof. The carrier is preferably adapted to be attached to the front bumper of the automobile, and is preferably adjustable to receive minnow buckets of different sizes. Also, the support for the air delivery funnel preferably provides for vertical adjustment of the latter so that it may be adjusted properly with relation to the particular size of minnow bucket being carried and so that it may be elevated out of the way to permit insertion of the minnow bucket or its removal relative to the carrier.

The present invention also contemplates a minnow bucket carrier and aerating device of the above kind which is extremely simple and durable in construction, easy to install and use, and otherwise well adapted to meet with the requirements for a successful commercial use.

The present invention consists in the novel form, combination and arrangement of parts hereinafter more fully described, shown in the accompanying drawing and claimed.

In the drawing:

Figure 1 is a view, partly in side elevation and partly in vertical section, showing a minnow bucket carrier and aerating device constructed in accordance with the present invention and operatively mounted upon the front bumper of an automobile.

Figure 2 is an enlarged horizontal section taken on line 2—2 of Figure 1.

Figure 3 is a fragmentary front elevational view showing the upper or intake end of the air delivery funnel.

Figure 4 is a fragmentary section on line 4—4 of Figure 2 showing details of the clamping band forming part of the minnow bucket carrier.

Figure 5 is a fragmentary section taken on line 5—5 of Figure 2; and

Figure 6 is a fragmentary top plan view showing an arm of the base of the bucket carrier, together with its adjustable bucket-retaining jaw.

Referring in detail to the drawing, 5 indicates a conventional minnow or live bait bucket having a central ventilating opening 6 in the top thereof and adapted to contain water as at 7 in which the minnows or live bait are placed. The present invention relates to a carrier for the bucket 5 whereby the latter may be attached to and carried by an automobile exteriorly of the latter. Such carrier preferably includes a base composed of rigidly associated crossed bars providing a plurality of radial arms 8 which are preferably of channel form with side flanges facing upwardly. Slidably fitted in the arms 8 are adjustable angular jaws 9 which are adjustable radially to suit the particular diameter of the bucket 5 being carried, said jaws being adapted to be set to engage the sides of the bucket at the lower end of the latter so as to retain said bucket against lateral displacement. The jaws 9 are held in adjusted positions by means of bolts 10 passing through the jaws and through the desired ones of a longitudinal series of apertures 11 provided in the arms 8. Integral with and extending upwardly from one of the arms 8 is an upright or standard 12 having rigidly attached to the upper end thereof a flexible clamping band including a horizontal resilient metallic band member 13 provided with a lining of soft friction material 14 on the inner face thereof. The clamping band is of split construction and preferably has the ends thereof connected by an elastic tightening device consisting of a bracket 15 slidably adjustable on one end portion of the band member 13 and having one end of a helical tension spring 16 attached thereto. The other end of spring 16 carries a hook 17 detachably engaged by a loop-like link 18 pivotally carried by a tightening lever 19 which is in turn pivoted as at 20 to the other end of band 13. In use, the bucket 5 is set within the clamping band, after which the link 18 is engaged over the hook 17 and the lever 19 is swung toward the band member 13 in a direction away from spring 16 so as to place the latter under tension and draw the clamping band into tight or snug gripping engagement with the bucket 5 at a point intermediate the top and bottom of the latter. By adjusting the bracket 15 longitudinally of the band member 13, the clamping band may be varied in size to accommodate the buckets of different sizes or diameters, and it will be seen that the jaws 9 and the clamping band provide for firmly holding the bucket against movement either laterally or vertically while maintaining said bucket down upon the base composed of arms 8.

Suitable means is provided for securing the carrier to an automobile exteriorly of the latter. This means is preferably adapted to attach the carrier to the front bumper of the automobile, in which case it consists of a vertical bar 21 rigid with and depending from the base preferably at the point where the arms 8 cross, and a clamping plate 22 adjustably connected to the bar 21 by means of bolts 23. The arrangement is such that the bar 21 may be disposed at one side of the front automobile bumper 24 and the plate 22 may be disposed at the other side of said bumper, after which the nuts on bolts 23 may be tightened so as to draw the plate 22 toward the bar 21 until the carrier is firmly clamped to the bumper.

The present invention also contemplates the provision of means for delivering fresh air into the bucket 5 beneath the normal water level thereof, upon forward travel of the automobile on which the device is mounted. For this purpose, I provide an air delivery funnel 25 which is of elbow form and preferably tapers smaller from its upper horizontal end to its lower vertical end. The smaller vertical end of the funnel 25 is adapted to pass through the opening 6 in the top of the bucket 5 and be positioned to extend below the water level in the bucket as shown clearly in Figure 1. Also, the upper end of funnel 25 is arranged to face forwardly or in the direction of the line of travel of the automobile on which the device is mounted. In this way, fresh air is effectively caught by the funnel and delivered rearwardly and downwardly into the minnow bucket below the water level of the latter, thereby effectively aerating the water and assisting in keeping the live bait within the bucket alive during transit. The funnel 25 is supported in proper position by means of a vertical supporting bar 26 attached to the upper end of the funnel 25 as at 27 and depending from the latter with its lower end slidably received in the channel-shaped upright 12. The upright 12 has a cross piece 28 connecting the side flanges thereof near the upper end of the same and behind which the supporting bar 26 is disposed, a set screw 29 being threaded through the cross piece 28 in position to impinge the bar 26 and maintain it in the desired vertically adjusted position. Thus, the funnel may be properly set and maintained in set or adjusted position with respect to a particular size of pail secured upon the carrier. Also, the set screw 29 may be loosened so as to permit the funnel 25 to be elevated out of the way entirely above the minnow bucket, whereby said bucket may be conveniently placed upon or removed from the carrier. This may be facilitated by swinging the funnel 25 to a general horizontal position above the hinge connection 27 between the supporting bar 26 and the funnel, and such hinge connection includes a pivot bolt which may be tightened to fix the funnel against swinging relative to the bar 26 when the device is operatively disposed as in Figure 1.

In some cases, it may not be convenient to mount the device upon an automobile bumper 24 with the funnel 25 facing toward the upright 12. Accordingly in such cases, the bar 26 may be positioned at the front of the bumper instead of at the back of the latter, in which case the upright 12 will be disposed nearest the radiator of the automobile. This position will be permitted because the arm 8 carrying the upright 12 is shorter than the remaining arms 8, and when the device is used in this way the funnel 25 may be set to face away from the upright 12 as indicated in dotted lines in Figure 1. In order to support the funnel when set in the dotted line position of Figure 1, the band member 13 of the clamping band has a loop 30 fixed thereto at a point diametrically opposite to the upright 12 and in position to slidably receive the supporting bar 26. Also, this loop 30 is threaded to receive the set screw 29 so that it may be tightened to impinge the bar 26 when positioned in said loop 30, for securing the bar in the desired vertically adjusted position. In any position of use, the funnel 25 will of course be disposed to face forwardly or in the line of travel of the automobile upon which the device is mounted.

From the foregoing description, it is believed that the construction and operation or manner of use of the present invention will be readily understood and appreciated by those skilled in the art. It is to be understood that changes may be made in the construction and in the combination and arrangement of the several parts provided such changes fall within the scope of the appended claims.

What I claim as new is:

1. In combination, a minnow bucket carrier, an elbow-shaped air delivery funnel, and means to mount said funnel upon and for vertical adjustment relative to the carrier.

2. In combination, a minnow bucket carrier including a base having radially adjustable jaws to receive and retain minnow buckets of various sizes, an upright rigid with the base, an adjustable clamping band carried by said upright and disposed horizontally to encircle the minnow bucket intermediate the top and bottom of the latter, an elbow-shaped air delivery funnel having a depending supporting bar pivoted thereto, and means to connect said supporting bar to said upright for vertical adjustment relative to the latter.

WILLIAM FLOYD COLLIER.